(12) United States Patent
Paluri et al.

(10) Patent No.: US 11,297,327 B2
(45) Date of Patent: Apr. 5, 2022

(54) IMAGE CODING METHOD BASED ON MOTION VECTOR AND APPARATUS THEREFOR

(71) Applicant: LG Electronics Inc., Seoul (KR)

(72) Inventors: Seethal Paluri, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/060,792

(22) Filed: Oct. 1, 2020

(65) Prior Publication Data

US 2021/0021834 A1    Jan. 21, 2021

Related U.S. Application Data

(63) Continuation of application No. PCT/KR2019/003251, filed on Mar. 20, 2019.

(Continued)

(51) Int. Cl.
*H04N 19/139* (2014.01)
*H04N 19/159* (2014.01)

(Continued)

(52) U.S. Cl.
CPC ......... *H04N 19/139* (2014.11); *H04N 19/159* (2014.11); *H04N 19/167* (2014.11);

(Continued)

(58) Field of Classification Search
CPC .. H04N 19/132; H04N 19/139; H04N 19/159; H04N 19/167; H04N 19/172;

(Continued)

(56) References Cited

U.S. PATENT DOCUMENTS

2012/0320981 A1* 12/2012 Shimada ............... H04N 19/33
375/240.16
2013/0315571 A1* 11/2013 Park .................... H04N 19/176
386/329

(Continued)

FOREIGN PATENT DOCUMENTS

EP    3343922    7/2018
EP    3844960    7/2021

(Continued)

OTHER PUBLICATIONS

Bossen et al., "Non-CE4: On Temporal Motion Buffer Compression," JVET-M0512, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 3 pages.

(Continued)

*Primary Examiner* — James T Boylan
(74) *Attorney, Agent, or Firm* — Fish & Richardson P.C.

(57) ABSTRACT

A picture decoding method performed by a decoding apparatus according to the present disclosure includes obtaining motion prediction information from bitstream, generating an affine MVP candidate list including affine MVP candidates for a current block, deriving CPMVPs for respective CPs of the current block based on one of the affine MVP candidates included in the affine MVP candidate list, deriving the CPMVDs for the CPs of the current block based on information on CPMVDs for each of the CPs included in the obtained motion prediction information, deriving CPMVs for the CPs of the current block based on the CPMVPs and the CPMVDs, deriving prediction samples for the current block based on the CPMVs, and generating reconstructed samples for the current block based on the derived prediction samples.

17 Claims, 10 Drawing Sheets

Related U.S. Application Data

(60) Provisional application No. 62/651,648, filed on Apr. 2, 2018, provisional application No. 62/665,456, filed on May 1, 2018.

(51) Int. Cl.
*H04N 19/167* (2014.01)
*H04N 19/172* (2014.01)
*H04N 19/176* (2014.01)
*H04N 19/184* (2014.01)
*H04N 19/46* (2014.01)
*H04N 19/52* (2014.01)
*H04N 19/91* (2014.01)

(52) U.S. Cl.
CPC ......... *H04N 19/172* (2014.11); *H04N 19/176* (2014.11); *H04N 19/184* (2014.11); *H04N 19/46* (2014.11); *H04N 19/52* (2014.11); *H04N 19/91* (2014.11)

(58) Field of Classification Search
CPC .... H04N 19/176; H04N 19/184; H04N 19/46; H04N 19/52; H04N 19/91
See application file for complete search history.

(56) References Cited

U.S. PATENT DOCUMENTS

| | | | | |
|---|---|---|---|---|
| 2015/0016512 | A1* | 1/2015 | Pu | H04N 19/147 375/240.03 |
| 2017/0118540 | A1* | 4/2017 | Thomas | H04N 19/167 |

FOREIGN PATENT DOCUMENTS

| | | |
|---|---|---|
| JP | 2013005168 | 1/2013 |
| JP | 2014509469 | 4/2014 |
| JP | 2017508349 | 3/2017 |
| JP | 2017200215 | 11/2017 |
| KR | 20140102639 | 8/2014 |
| KR | 20160106127 | 9/2016 |
| KR | 20170013397 | 2/2017 |
| KR | 20170066411 | 6/2017 |
| WO | WO2017034113 | 3/2017 |
| WO | WO2020139172 | 7/2020 |

OTHER PUBLICATIONS

Partial Supplementary European Search Report in European Appln. No. 19782234.9, dated Dec. 7, 2021, 58 pages.

Su & Segall, "CE9: Reduced resolution storage of motion vector data," JCTVC-D072, Presented at Joint Collaborative Team on Video Coding (JCT-VC) of ITU-T SG16 WP3 and ISO/IEC JTC1/SC29/WG11, 4th Meeting: Daegu, KR, Jan. 20-28, 2011, 3 pages.

Bossen et al., "Non-CE4: On Temporal Motion Buffer Compression," JVET-M0512_r2, Presented at Joint Video Experts Team (JVET) of ITU-T SG 16 WP 3 and ISO/IEC JTC 1/SC 29/WG 11, 13th Meeting: Marrakech, MA, Jan. 9-18, 2019, 10 pages.

Office Action in Korean Appln. No. 10-2020-7025161, dated Jan. 3, 2022, 13 pages (with English translation).

Office Action in Japanese Appln. No. 2020-554261, dated Jan. 18, 2022, 7 pages (with English translation).

* cited by examiner

<reference picture>　　<current picture>

IMAGE CODING METHOD BASED ON MOTION VECTOR AND APPARATUS THEREFOR

CROSS-REFERENCE TO RELATED APPLICATIONS

Pursuant to 35 U.S.C. § 119(e), this application is a continuation of International Application PCT/KR2019/003251, with an international filing date of Mar. 20, 2019, which claims the benefit of U.S. Provisional Patent Application Nos. 62/651,648 filed on Apr. 2, 2018, and 62/665,456 filed on May 1, 2018, the contents of which are hereby incorporated by reference herein in its entirety.

BACKGROUND OF THE DISCLOSURE

Field of the Disclosure

The present disclosure relates to an image coding technology, and more specifically, to an image coding method and apparatus based on a motion vector in an image coding system.

Related Art

Demands for high-resolution and high-quality images, such as High Definition (HD) images and Ultra High Definition (UHD) images, are increasing in various fields. As image data has high resolution and high quality, the amount of information or bits to be transmitted increases relative to legacy image data. Accordingly, when image data is transmitted using a medium, such as a conventional wired/wireless broadband line, or image data is stored using an existing storage medium, a transmission cost and a storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide a method and an apparatus for enhancing efficiency of inter prediction based on a motion vector.

Still another object of the present disclosure is to provide a method and an apparatus for storing information about the motion vector based on motion vector compression in an inter prediction process based on the motion vector.

Yet another object of the present disclosure is to provide a method and an apparatus for storing information about the motion vector based on the motion vector compression in the inter prediction process based on the motion vector, thereby enhancing image coding efficiency.

Still yet another objection of the present disclosure is to provide a method and an apparatus for storing the information about the motion vector based on the motion vector compression in the inter prediction process based on the motion vector, thereby reducing the number of bits required for storing the information about the motion vector.

An exemplary embodiment of the present disclosure provides a picture decoding method performed by a decoding apparatus. The method includes: receiving information about motion vector compression, deriving a motion vector for a current block included in a current picture, deriving a predicted block for the current block based on the motion vector for the current block, storing information about the motion vector for the current block based on the information about the motion vector compression, and generating a reconstructed picture for the current picture based on the predicted block for the current block.

Another exemplary embodiment of the present disclosure provides a decoding apparatus for performing a picture decoding. The decoding apparatus includes: a predictor for receiving information about motion vector compression, deriving a motion vector for a current block included in a current picture, and deriving a predicted block for the current block based on the motion vector for the current block, a memory for storing information about the motion vector for the current block based on the information about the motion vector compression, and an adder for generating a reconstructed picture for the current picture based on the predicted block for the current block.

Still another exemplary embodiment of the present disclosure provides a picture encoding method performed by an encoding apparatus. The method includes: deriving a motion vector for a current block, generating information about motion vector compression, deriving a predicted block for the current block based on the motion vector for the current block, storing information about the motion vector for the current block based on the information about the motion vector compression, deriving residual samples for the current block based on the predicted block for the current block, and encoding image information including information about the residual samples and the information about the motion vector compression.

Yet another exemplary embodiment of the present disclosure provides an encoding apparatus for performing a picture encoding. The encoding apparatus includes: a predictor for deriving a motion vector for a current block, generating information about motion vector compression, and deriving a predicted block for the current block based on the motion vector for the current block, a memory for storing information about the motion vector for the current block based on the information about the motion vector compression, a residual processor for deriving residual samples for the current block based on the predicted block for the current block, and an entropy encoder for encoding image information including information about the residual samples and the information about the motion vector compression.

The present disclosure may enhance the overall image/video compression efficiency.

The present disclosure may enhance the efficiency of the inter prediction based on the motion vector.

The present disclosure may limit the motion vector stored in the motion field storage in the inter prediction process based on the motion vector, thereby enhancing the image coding efficiency.

The present disclosure may store the information about the motion vector based on the motion vector compression in the inter prediction process based on the motion vector, thereby enhancing image coding efficiency.

The present disclosure may store the information about the motion vector based on the motion vector compression in the inter prediction process based on the motion vector, thereby reducing the number of bits required for storing the information about the motion vector.

DESCRIPTION OF EXEMPLARY EMBODIMENTS

Figure 1:
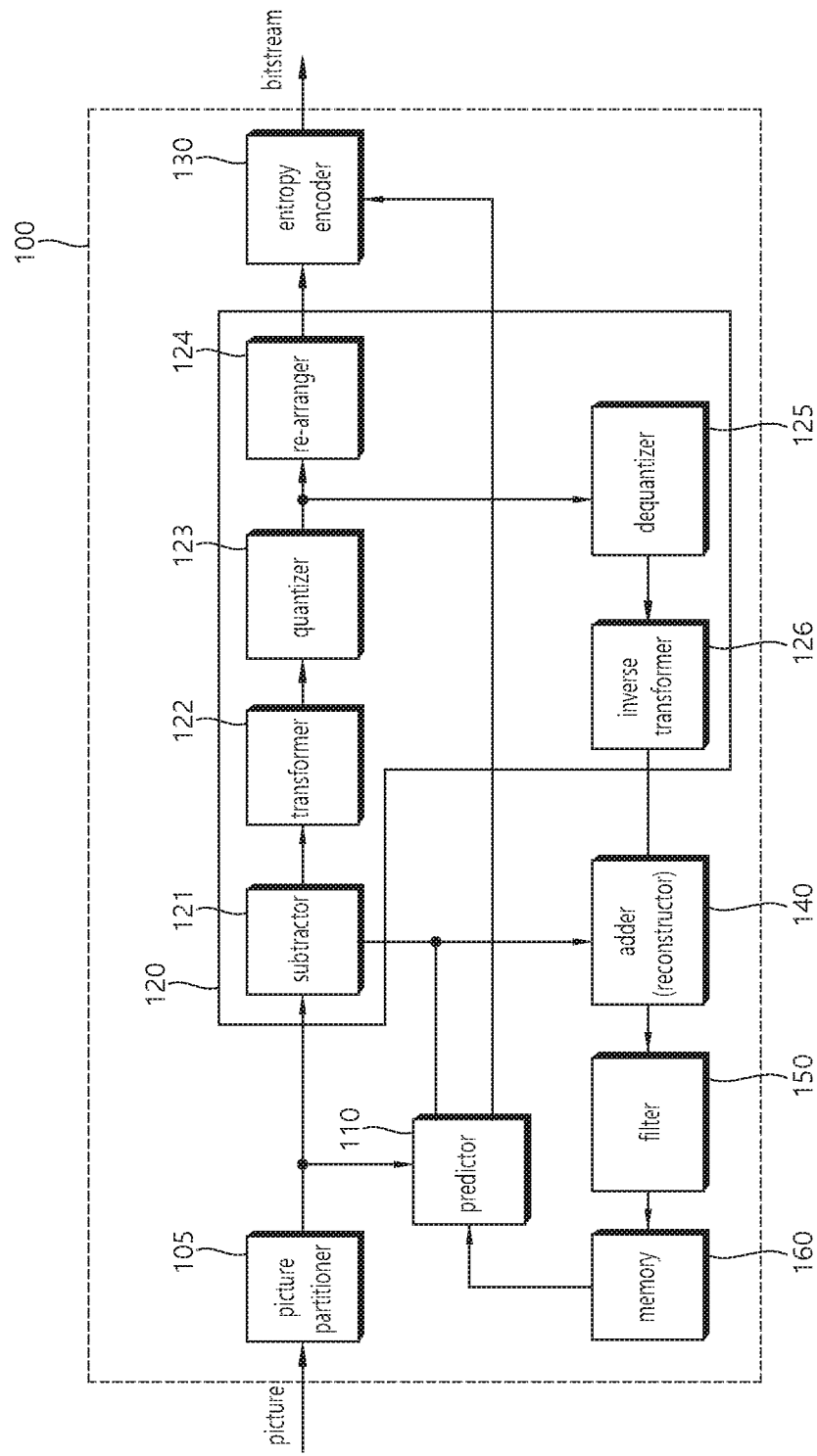
FIG. 1 schematically illustrates a configuration of an encoding apparatus according to an exemplary embodiment.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

The following description may be applied in the technical field which deals with videos, images, or images. For example, a method or an exemplary embodiment disclosed in the following description may be associated with the disclosed contents of a Versatile Video Coding (VVC) standard (ITU-T Rec. H.266), a next-generation video/image coding standard after the VVC, or standards before the VVC (for example, a High Efficiency Video Coding (HEVC) standard (ITU-T Rec. H.265) or the like).

Hereinafter, examples of the present embodiment will be described in detail with reference to the accompanying drawings. In addition, like reference numerals are used to indicate like elements throughout the drawings, and the same descriptions on the like elements will be omitted.

In the present disclosure, a video may mean a set of a series of images according to a passage of time. Generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information about the area. Optionally, the unit may be mixed with terms such as a block, an area, or the like. In a typical case, an M×N block may represent a set of samples or transform coefficients arranged in M columns and N rows.

FIG. 1 briefly illustrates a structure of an encoding apparatus to which the present disclosure is applicable. Hereinafter, an encoding/decoding apparatus may include a video encoding/decoding apparatus and/or an image encoding/decoding apparatus, and the video encoding/decoding apparatus may be used as a concept comprising the image encoding/decoding apparatus, or the image encoding/decoding apparatus may be used as a concept comprising the video encoding/decoding apparatus.

Referring to FIG. 1, a video encoding apparatus 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quadtree structure, a binary tree structure and/or a ternary tree structure. In this case, for example, the quad tree structure may be first applied and the binary tree structure and ternary tree structure may be applied later. Alternatively, the binary tree structure/ternary tree structure may be applied first. The coding procedure according to the present embodiment may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transform, and reconstruction, which will be described later.

In another example, the processing unit may include a coding unit (CU) prediction unit (PU), or a transformer (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units less than the smallest coding unit. Here, the final coding unit refers to a coding unit which is partitioned or split to a prediction unit or a transformer. The prediction unit is a unit which is partitioned from a coding unit, and may be a unit of sample prediction. Here, the prediction unit may be divided into sub-blocks. The transformer may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transformer may be referred to as a transform block (TB). The prediction block or prediction unit may refer to a specific area in the form of a block in a picture and include an array of prediction samples. Also, the transform block or transformer may refer to a specific area in the form of a block in a picture and include the transform coefficient or an array of residual samples.

The predictor 110 may perform prediction on a processing target block (hereinafter, it may represent a current block or a residual block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and may be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transform based on the size of a corresponding transform block and a prediction mode applied to a coding block or prediction block spatially overlapping with the transform block. For example, residual samples may be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding, according to an entropy encoding or according to a pre-configured method, together or separately on information (e.g., a syntax element value or the like) required for video reconstruction in addition to the quantized transform coefficients. The entropy-encoded information may be transmitted or stored in unit of a network abstraction layer (NAL) in a bit stream form. The bitstream may be transmitted via a network or be stored in a digital storage medium. Here, the network may include a broadcasting network or a communications network, the digital storage medium may include various storage medium such as USB, SD, CD, DVD, blue-ray, HDD, SDD and so on.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization may be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
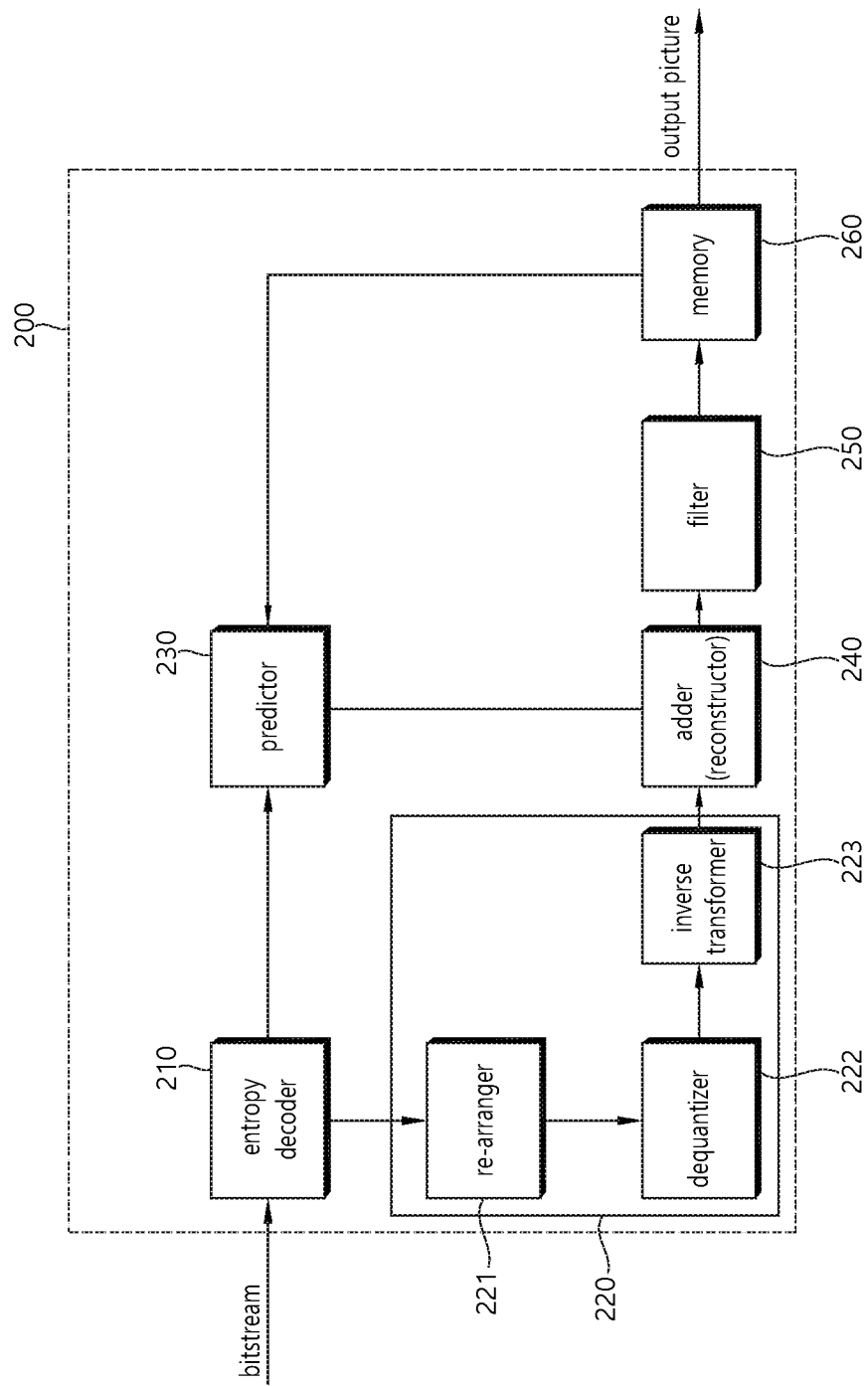
FIG. 2 is a diagram for schematically explaining a configuration of a decoding apparatus according to the exemplary embodiment.

FIG. 2 briefly illustrates a structure of a video/image decoding apparatus to which the present disclosure is applicable. Hereinafter, a video decoding apparatus may include an image decoding apparatus.

Referring to FIG. 2, a video decoding apparatus 200 may include an entropy decoder 210, a residual processor 220, a predictor 230, an adder 240, a filter 250, and a memory 260. The residual processor 220 may include a re-arranger 221, a dequantizer 222, an inverse transformer 223.

Further, although it is not depicted, the video decoding apparatus 200 may include a receiver for receiving a bitstream including video information. The receiver may be configured as a separate module or may be included in the entropy decoder 210.

When a bit stream including video/image information is input, the video decoding apparatus 200 may reconstruct a video/image/picture in association with a process by which video information is processed in the video encoding apparatus.

For example, the video decoding apparatus 200 may perform video decoding using a processing unit applied in the video encoding apparatus. Thus, the processing unit block of video decoding may be, for example, a coding unit and, in another example, a coding unit, a prediction unit or a transformer. The coding unit may be split from the largest coding unit according to the quad tree structure and/or the binary tree structure and/or ternary tree structure.

A prediction unit and a transformer may be further used in some cases, and in this case, the prediction block is a block derived or partitioned from the coding unit and may be a unit of sample prediction. Here, the prediction unit may be divided into sub-blocks. The transformer may be split from the coding unit according to the quad tree structure and may be a unit that derives a transform coefficient or a unit that derives a residual signal from the transform coefficient.

The entropy decoder 210 may parse the bit stream to output information required for video reconstruction or picture reconstruction. For example, the entropy decoder 210 may decode information in the bit stream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method may receive a bin corresponding to each syntax element in a bit stream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method may update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding apparatus. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding apparatus.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding apparatus, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding apparatus. Motion information may include a motion vector and a reference picture. In the skip mode and the merge mode, a firstly-ordered picture in the reference picture list may be used as a reference picture when motion information of a temporal neighboring block is used.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list may be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding apparatus may obtain a motion vector difference (MVD) between the motion vector of the current block and a motion vector predictor, encode the MVD and output the encoded MVD in the form of a bit stream. That is, the MVD may be obtained by subtracting the motion vector predictor from the motion vector of the current block. Here, the predictor 230 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 240 may add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter-prediction of a picture afterward, the encoding apparatus may also dequantize/inverse-transform the quantized transform coefficients to derive a residual block and generate a reconstructed picture based thereon.

Figure 3:
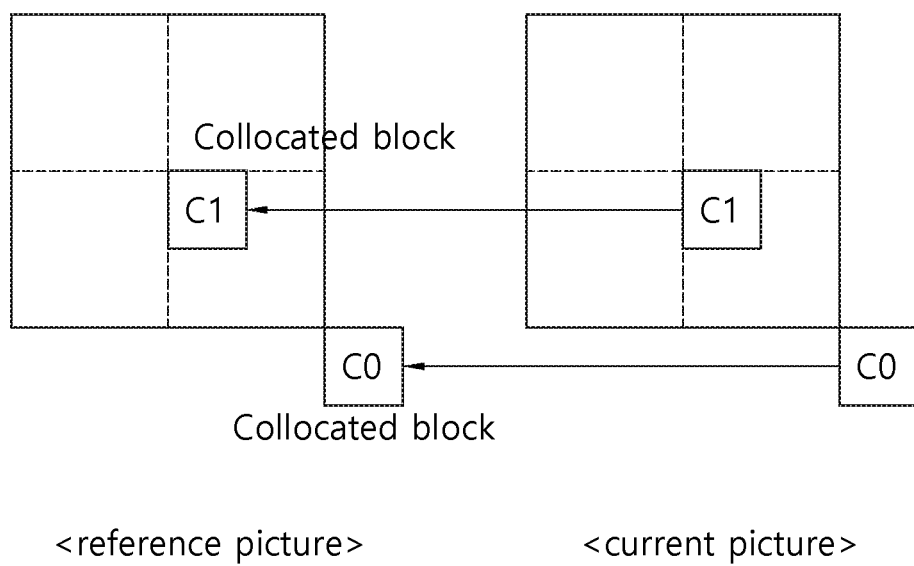
FIG. 3 is a diagram for explaining a TMVP candidate according to the exemplary embodiment.

FIG. 3 is a diagram for explaining a TMVP candidate according to the exemplary embodiment.

In the exemplary embodiment, a TMVP may be included as a MVP candidate or a merge candidate in the inter prediction of the encoding apparatus 100 or the decoding apparatus 200. More specifically, the decoding apparatus 200 may derive a motion information candidate list (e.g., MVP candidate list) based on a spatial neighboring block and/or temporal neighboring block of the current block, select one of the candidates included in the motion information candidate list based on the received selection information (e.g., merge index, MVP flag, or MVP index), and derive motion information of the current block based on the selected candidate. The decoding apparatus 200 may generate the prediction sample based on the derived motion information. Here, for example, the decoding apparatus 200 may derive the selected candidate as the MVP of the current block. Further, the temporal neighboring block may represent a collocated block within the reference picture corresponding to the current block, and a TMVP method may represent a method for deriving the motion vector of the collocated block as the temporal candidate of the motion information candidate list, and using the temporal candidate derived from the motion vector of the collocated block as the MVP of the current block.

Referring to FIG. 3, the TMVP may define the block within the reference picture corresponding to a bottom-right location of the current block as a collocated block C0, and use a motion vector of the corresponding block as the MVP. At this time, if the block at the bottom-right location C0 may be used for only the intra prediction, or if the block of the bottom-right location C0 is unavailable due to the reason such as exceeding a picture boundary, the block corresponding to a center location C1 of the current block may be used as the collocated block. Here, the center location may represent a center bottom-right location. That is, the center location may represent a location of the bottom-right sample among four samples in the case where four samples are located on the center of the current block. As an example, the RB location may be called a ColBr, and the C1 location may be called a ColCtr. Meanwhile, the picture including the collocated block may be referred to as a collocated picture or a collocated frame.

In the exemplary embodiment, if the size of the block increases, the C1 may be preferentially considered over C0 in deriving the TMVP candidate. Alternatively, if collocated blocks of other locations other than the C0 and the C1 better represent the motion information of the current block, the collocated blocks at other locations other than the C0 and the C1 may be used in deriving the TMVP candidate.

In another exemplary embodiment, even if the shape of the block is non-square, the C1 is considered preferentially over the C0 in deriving the TMVP candidate, or the TMVP candidate may be derived based on the collocated blocks of other locations other than the C0, C1 or a top-left corner location. The shape of the non-square block may include, for example, a rectangular shape or the like.

In still another exemplary embodiment, a modified pixel location within the signaled block rather than the top-left corner pixel location may be used in the process of deriving the TMVP candidate. An example of syntaxes for explaining the present exemplary embodiment is expressed in Table 1 below.

TABLE 1

| | Description |
|---|---|
| seq_parameter_set_rbsp( ) { | |
| ... | |
| adaptive_pixel_loc_flag | u(1) |
|    if(adaptive_pixel_loc_flag){ | |
|       adaptive_pix_idx | ue(v) |
|    } | |
| ... | |
| } | |

In Table 1, if the adaptive_pixel_loc_flag is activated, the adaptive_pix_idx may be parsed in the decoding apparatus. That is, if a value of the adaptive_pixel_loc_flag is 1, the adaptive_pix_idx may be additionally signaled, and if the value of the adaptive_pixel_loc_flag is 0, the top-left corner pixel location of the current block may be used in the process of deriving the TMVP candidate. The adaptive_pix_idx may mean an index for representing a specific pixel location within the current block based on a raster scan order.

The example according to Table 1 discloses that the syntaxes are signaled at a sequence parameter set (SPS) level, but the example is not limited thereto. For example, to represent that the modified pixel location within the signaled block rather than the top-left corner pixel location is used in the process of deriving the TMVP candidate, the syntaxes may also be signaled at a picture parameter set (PPS) level, a CU level or a PU header level.

Figure 4:
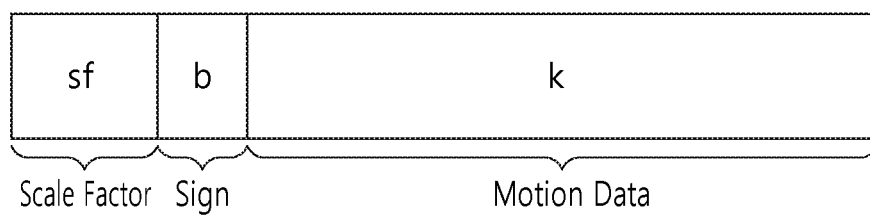
FIG. 4 is a diagram illustrating information about a motion vector according to the exemplary embodiment.

FIG. 4 is a diagram illustrating information about the motion vector according to the exemplary embodiment.

While the inter prediction is performed, the motion vector of each coding unit or prediction unit may be decoded, and a motion vector field (MVF) of each coding unit or prediction unit may be updated. Information stored in the MVF may include a motion vector, a reference index, list information, prediction mode information, and the like. Bits may be needed for expressing the information stored in the MVF, and thus if the motion information of a number of MVFs is stored in the motion field storage, overhead may be applied to the motion field storage.

In the exemplary embodiment, 16, 18, 20 bits or the like may be, for example, used to represent a motion vector in a range of $-2^{15}$ to $2^{15}-1$. The number of bits necessary for representing the motion vector may be varied according to the type of sub-pel. In a more specific example, if the motion vector in the range of $-2^{15}$ to $2^{15}-1$ is stored in units of quarter-pel, 18 bits may be used. At this time, 1 bit may be used to represent a sign of the motion vector, and 15 bits may be used to represent a binary of 15 digits. Hereinafter, the representation of the motion vector based on the method in the present example is referred to as "motion vector non-compression".

To reduce the number of bits necessary for storing the motion vector, that is, to increase the motion vector compression, the exemplary embodiment of the present disclosure proposes a method for using a fewer number of bits than 16. Hereinafter, the reduction in the information necessary for storing the motion vector, for example, the number of bits is referred to as "motion vector compression".

FIG. 4 corresponds to an example of the motion vector compression. The motion vector compression may be applied independently of a predefined motion vector resolution regarding the corresponding video coding system. As the motion vector resolution, for example, there may be a quarter-pel, a half-pel, a one-sixteenth pel, or the like.

A motion vector structure illustrated in FIG. 4 is composed of a scale factor, a sign, and motion data. In the exemplary embodiment, the motion vector may be derived based on Equation 1 below.

$$MV = (\text{Scale Factor} \times \text{Motion Data}) \times \text{Sign} \quad \text{Equation 1}$$

It may be confirmed that the motion vector in Equation 1 is derived through the multiplication of the scale factor, the sign, and the motion data.

In representing the motion vector in the range of $-2^{15}$ to $2^{15}-1$, according to the exemplary embodiment of the present disclosure, sf, which is the number of bits for representing the scale factor, k, which is the number of bits for representing the motion data, and b(=1), which is the number of bits for representing the sign may satisfy Equation 2 below.

$$sf + k + b < 16 \quad \text{Equation 2}$$

In an example, if the sf is 2, the scale factor may be derived as expressed in Table 2 below.

TABLE 2

| sf binary code | Scale Factor |
|---|---|
| 00 | 1 |
| 01 | 2 |
| 10 | 4 |
| 11 | 8 |

Referring to Table 2, it may be confirmed that a binary code 00 of information about the scale factor represents a scale factor 1, a binary code 01 represents a scale factor 2, a binary code 10 represents a scale factor 4, and a binary code 11 represents a scale factor 8.

In an example, the sf may be 4. If the sf is 4, the scale factor may be derived, for example, as expressed in Table 3 below.

TABLE 3

| sf binary code | Scale Factor |
|---|---|
| 0000 | 1 |
| 0001 | 2 |
| 0010 | 4 |
| 0011 | 8 |
| 0100 | 16 |
| 0101 | 32 |
| 0110 | 64 |
| 0111 | 128 |
| 1000 | 256 |
| 1001 | 512 |
| 1010 | 1024 |
| 1011 | 2048 |
| 1100 | 4096 |
| 1101 | 8192 |
| 1110 | 16384 |
| 1111 | 32768 |

The sf binary code, the numerical value of the scale factor, and the corresponding relationship expressed in Table 3 are merely illustrative, and may be variously expressed in a method similar thereto.

In an example, a k=5 bit may be used to represent the motion data. The motion data may include, for example, payload information. At this time, a b=1 bit may be used to represent the sign of the motion vector, and a sf=4 bit may be used to represent the scale factor.

In another exemplary embodiment, the motion vector may be expressed based on an exponent value of the motion vector and a mantissa value of the motion vector. Here, the mantissa value of the motion vector may include the information about the aforementioned motion data and sign. Further, the exponent value of the motion vector may correspond to the aforementioned scale vector. That is, the motion vector may also be represented based on the motion data, the sign, and the scale vector, or expressed based on the exponent value of the motion vector and the mantissa value of the motion vector.

In an example, when the motion vector is expressed based on the exponent value and the mantissa value, the exponent value of the motion vector may be expressed by 4 bits, and the mantissa value of the motion vector may be expressed by 6 bits. In the same example, if the motion vector is intended to be expressed based on the motion data, the sign, and the scale factor, the motion data may be expressed by 5 bits, the sign may be expressed by 1 bit, and the scale factor may be expressed by 4 bits. As described above, the combination of the motion data and the sign may represent the information corresponding to the mantissa value of the motion vector.

To apply the motion vector compression according to the exemplary embodiment of the present disclosure, at least one of information about the number of bits for representing the scale factor for the motion vector, information about the number of bits for representing the sign for the motion vector, information about the number of bits for representing the motion data for the motion vector, and information about whether the motion vector compression is to be applied may be included in information about the motion vector compression to be signaled. An example in which the information about the motion vector compression is signaled at the sequence parameter set (SPS) level is expressed in Table 4 below.

TABLE 4

| | Description |
|---|---|
| seq_parameter_set_rbsp( ) { | |
| ... | |
| compress_motion_flag | u(1) |
| if(compress_motion_flag){ | |
| num_bits_for_scaling_factor | ue(v) |
| num_bits_for_motion_payload | ue(v) |
| sign_bit_info | u(1) |
| } | |
| ... | |
| } | |

In Table 4, the compress_motion_flag may represent information about whether the motion vector compression is to be applied (or information about whether a parameter for the motion vector compression is signaled), the numb_bits_for_scaling_factor may represent the information about the number of bits for representing the scale factor for the motion vector, the num_bits_for_motion_payload may represent the information about the number of bits for representing the motion data for the motion vector, and the sign_bit_info may represent the information about the number of bits for representing the sign for the motion vector, respectively.

If a value of the compress_motion_flag is 1, parameters representing the information about the motion vector compression may be included in the SPS to be signaled. If the value of the compress_motion_flag is 0, the parameters representing the information about the motion vector compression may not be signaled.

In an example, if the size of the motion vector is $2^7$ under the motion vector resolution of a one-sixteenth pel, the motion data becomes $2^7 \times 16 = 2^{11}$ based on the motion vector non-compression, thereby requiring 12 bits, which are the sum of 11 bits for representing the motion data and 1 bit for representing the sign in order to represent the motion vector.

On the other hand, based on the motion vector compression in the example, if the scale vector is 8, the motion data become $2^7 \times 16/8 = 2^8$. Therefore, 11 bits, which are the sum of 8 bits for representing the motion data, 2 bits for representing the scale factor (however, the fact that 2 bits are necessary for representing the scale factor is merely illustrative, and the number of bits for representing the scale factor is not limited to 2), and 1 bit for representing the sign, are needed in order to represent the motion vector. Referring to the present example, it may be confirmed that if the motion vector compression is applied, 1 bit may be saved compared to the case where the motion vector compression is not applied. This matches with the result obtained by Equation 2. That is, if the motion vector compression is applied according to the exemplary embodiment of the present disclosure, it is possible to save the number of bits when the motion vector is stored in the motion field storage, thereby preventing the overhead of the motion field storage, and improving the overall coding efficiency of the image coding system.

Meanwhile, referring to Table 4, the information about the motion vector compression is exemplarily signaled at the SPS level, but the example is not limited thereto. For example, the information about the motion vector compression may also be signaled at a picture parameter set (PPS), slice segment header, tile group header, coding unit (CU) or prediction unit (PU) level. Further, although not expressed in Table 4, additional conditional flag information may also be signaled to represent the motion vector compression.

Figure 5:
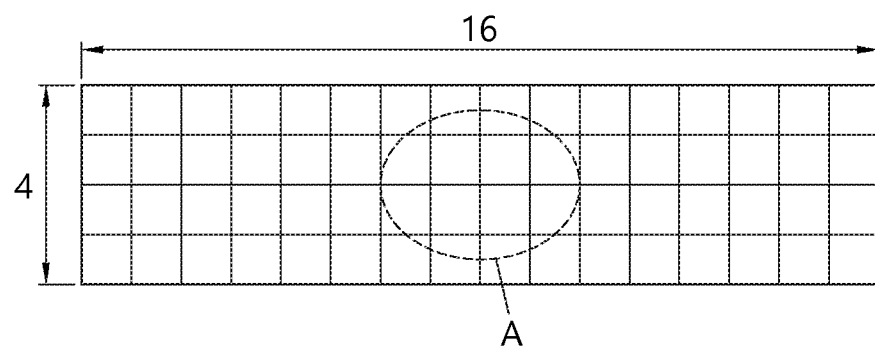
FIG. 5 is a diagram illustrating a location within a current block for deriving motion information according to the exemplary embodiment.

FIG. 5 is a diagram illustrating a location within the current block for deriving motion information according to the exemplary embodiment.

In the exemplary embodiment, the motion information about the block may be stored based on pixel locations other than the top-left pixel location of a 4×4 block. For example, different pixel locations may be used according to i) a prediction mode, ii) the size of the block, iii) the shape of the block, and/or iv) a motion model used to derive the MVF of the block.

FIG. 5 illustrates an example in which the motion information for a 4×16 rectangular block is stored based on a location A. Various locations in addition to the location A illustrated in FIG. 5 may be variously determined according to the prediction mode, the size of the block, the shape of the block, and/or the motion model used.

In another example, different pixel locations may be used according to the motion model. In a more specific example, since an affine prediction uses a 4-parameter motion model or a 6-parameter motion model, the pixel location may be adaptively determined according to whether it is the 4-parameter motion model or the 6-parameter motion model. The present example may be performed using the syntax transmitted based on the SPS, PPS, or other header information.

Figure 6:
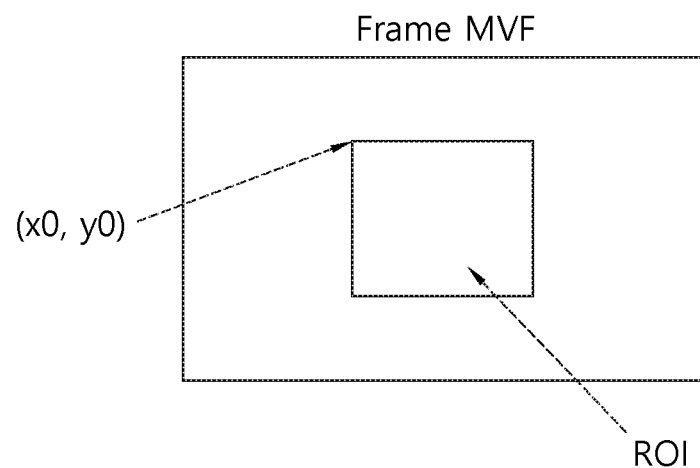
FIG. 6 is a diagram illustrating a region of interest within the current block according to the exemplary embodiment.

FIG. 6 is a diagram illustrating a region of interest (ROI) within the current block according to the exemplary embodiment.

In the exemplary embodiment, a region used for deriving the MVF within one picture or frame may be limited. In an example, a specific limit region may be represented within the picture based on a fixed map, or the specific limit region may be represented within the picture based on a map varying for each picture. The region of interest (ROI) illustrated in FIG. 6 may represent a limit region used for deriving the MVF within one picture or frame. Table 5 below expresses an example in which information about the ROI is signaled at the SPS level.

TABLE 5

| | Description |
|---|---|
| seq_parameter_set_rbsp( ) { | |
| ... | |
| roi_window_flag | u(1) |
|     if(roi_window_flag){ | |
|         roi_win_left_offset | ue(v) |
|         roi_win_right_offset | ue(v) |
|         roi_win_top_offset | ue(v) |
|         roi_win_bottom_offset | ue(v) |
|     } | |
| ... | |
| } | |

In Table 5, if a value of the roi_window_flag is 1, it may represent that ROI cropping window offset parameters will be subsequently included within the SPS. If the value of the roi_window_flag is 0, it may represent that the ROI cropping window offset parameters do not exist within the SPS. The roi_window_flag may correspond to an example of ROI flag information representing whether the MVF of the block is derived based on the ROI.

The roi_win_left_offset, the roi_win_right_offset, the roi_win_top_offset, and the roi_win_bottom_offset may be represented in view of a rectangular region specified in a picture coordinate for outputting samples of the pictures within a coded video sequence (CVS) output in the decoding process. For example, the roi_win_left_offset, the roi_win_right_offset, the roi_win_top_offset, and the roi_win_bottom_offset may represent coordinate information of the ROI. That is, the roi_win_left_offset, the roi_win_right_offset, the roi_win_top_offset, and the roi_win_bottom_offset may represent a left offset value of the ROI, a right offset value of the ROI, a top offset value of the ROI, and a bottom offset value of the ROI, respectively. If a value of the roi_window_flag is 0, all values of the roi_win_left_offset, the roi_win_right_offset, the roi_win_top_offset, and the roi_win_bottom_offset may be estimated as 0.

Table 5 expresses an example of the syntaxes of the SPS header, but the syntaxes may also be signaled through the PPS, the slice header, the tile group header, or other headers in the decoding process.

Figure 7:
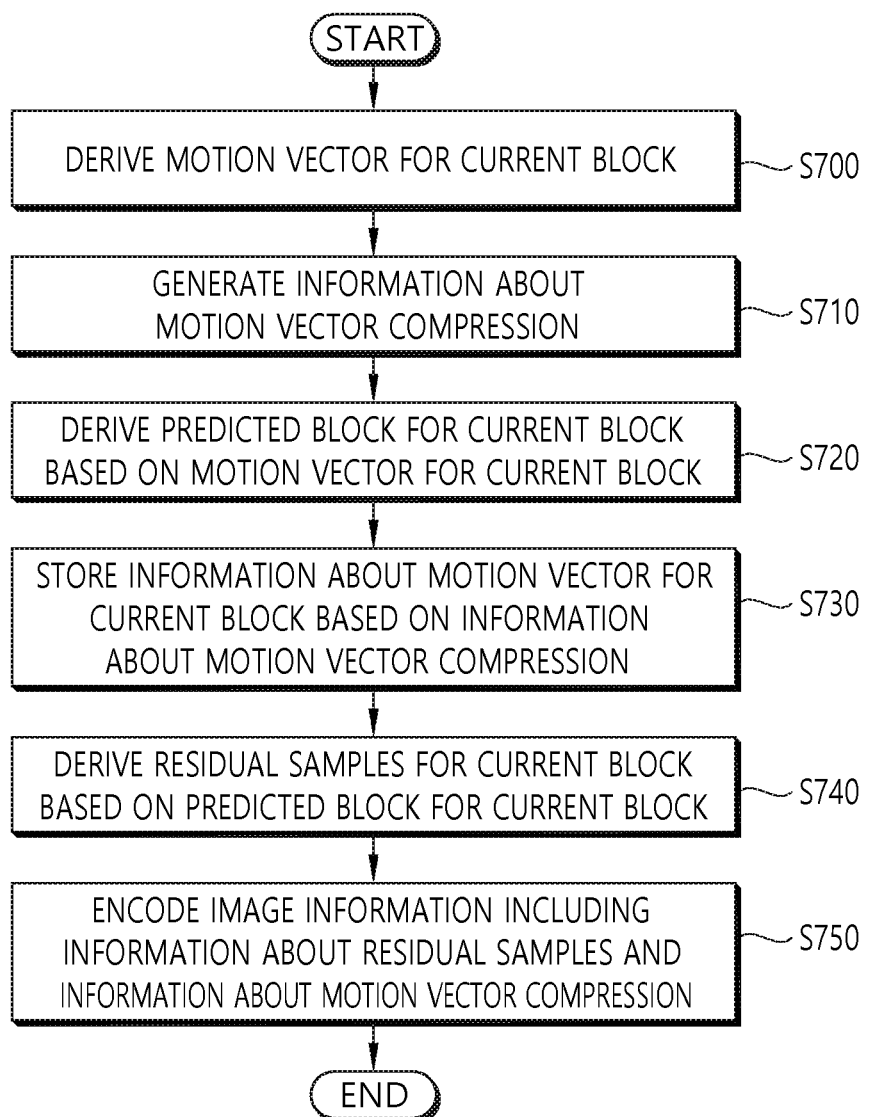
FIG. 7 is a flowchart illustrating an operation of the encoding apparatus according to the exemplary embodiment.
Figure 8:
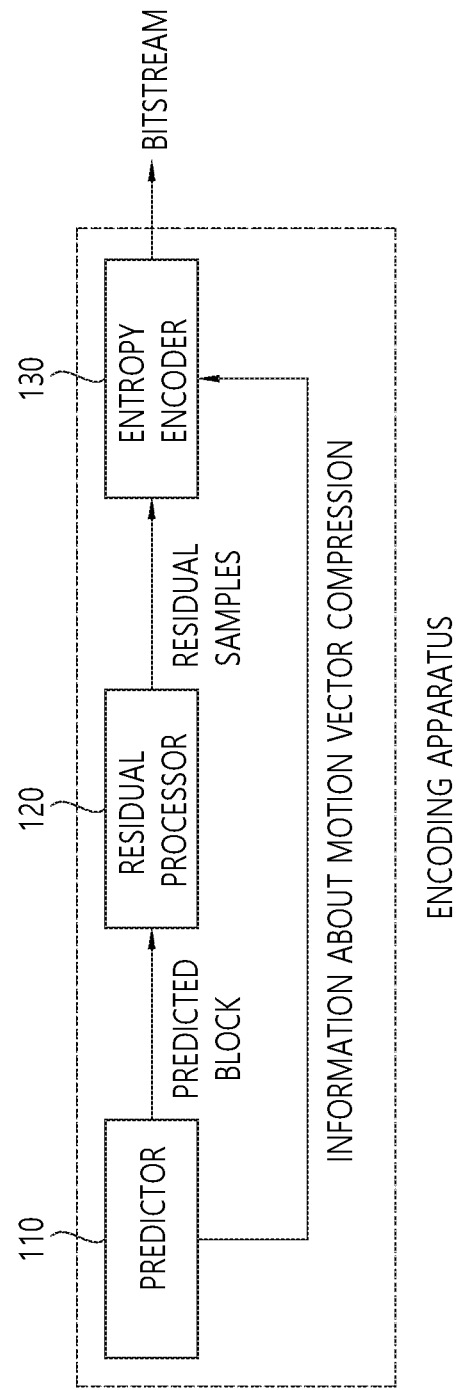
FIG. 8 is a block diagram illustrating a configuration of the encoding apparatus according to the exemplary embodiment.

FIG. 7 is a flowchart illustrating an operation of the encoding apparatus according to the exemplary embodiment, and FIG. 8 is a block diagram illustrating a configuration of the encoding apparatus according to the exemplary embodiment.

The encoding apparatus illustrated in FIGS. 7 and 8 may perform the operations corresponding to the decoding apparatus illustrated in FIGS. 9 and 10 to be described later. Therefore, the contents to be described later with reference to FIGS. 9 and 10 may also be applied to the encoding apparatus illustrated in FIGS. 7 and 8 in the same manner.

Each step illustrated in FIG. 7 may be performed by the encoding apparatus 100 illustrated in FIG. 1. More specifically, S700 to S720 may be performed by the predictor 110 illustrated in FIG. 1, S730 may be performed by the memory 160 or the predictor 110 illustrated in FIG. 1, S740 may be performed by the residual processor 120 illustrated in FIG. 1, and S750 may be performed by the entropy encoder 130 illustrated in FIG. 1. Further, the operations according to the S700 to the S750 are based on some of the contents described above with reference to FIGS. 3 to 6. Therefore, the description of a specific content overlapping the contents described above with reference to FIGS. 1, 3 to 6 will be omitted or simplified.

As illustrated in FIG. 8, the encoding apparatus according to the exemplary embodiment may include the predictor 110, the residual processor 120, and the entropy encoder 130. However, all the components illustrated in FIG. 8 may not be essential components of the encoding apparatus in some cases, and the encoding apparatus may be implemented by a more or fewer number of components than the components illustrated in FIG. 8. For example, the encoding apparatus may also include the memory 160.

In the encoding apparatus according to the exemplary embodiment, the predictor 110, the residual predictor 120, and the entropy encoder 130 may be implemented by a separate chip, respectively, or at least two components may also be implemented through one chip.

The encoding apparatus according to the exemplary embodiment may derive a motion vector for the current block (S700). More specifically, the predictor 110 of the encoding apparatus may derive the motion vector for the current block.

The encoding apparatus according to the exemplary embodiment may generate information about motion vector compression (S710). More specifically, the predictor 110 of the encoding apparatus may generate information about the motion vector compression.

The encoding apparatus according to the exemplary embodiment may derive a predicted block for the current block based on the motion vector for the current block (S720). More specifically, the predictor 110 of the encoding apparatus may derive the predicted block for the current block based on the motion vector for the current block.

The encoding apparatus according to the exemplary embodiment may store information about the motion vector for the current block based on the information about the motion vector compression (S730). More specifically, the memory 160 (not illustrated in FIG. 8) or the predictor 110 of the encoding apparatus may store the information about the motion vector for the current block based on the information about the motion vector compression.

The encoding apparatus according to the exemplary embodiment may derive residual samples for the current block based on the predicted block for the current block (S740). More specifically, the residual processor 120 of the encoding apparatus may derive the residual samples for the current block based on the predicted block for the current block.

The encoding apparatus according to the exemplary embodiment may encode image information including information about the residual samples and the information about the motion vector compression (S750). More specifically, the entropy encoder 130 of the encoding apparatus may encode the image information including the information about the residual samples and the information about the motion vector compression.

According to the encoding apparatus and an operation method of the encoding apparatus illustrated in FIGS. 7 and 8, the encoding apparatus may derive the motion vector for the current block (S700), generate the information about the motion vector compression (S710), derive the predicted block for the current block based on the motion vector for the current block (S720), store the information about the motion vector for the current block based on the information about the motion vector compression (S730), derive the residual samples for the current block based on the predicted block for the current block (S740), and encode the image information including the information about the residual samples and the information about the motion vector compression (S750). That is, it is possible to store the information about the motion vector based on the motion vector compression in the inter prediction process based on the motion vector, thereby enhancing image coding efficiency.

Figure 9:
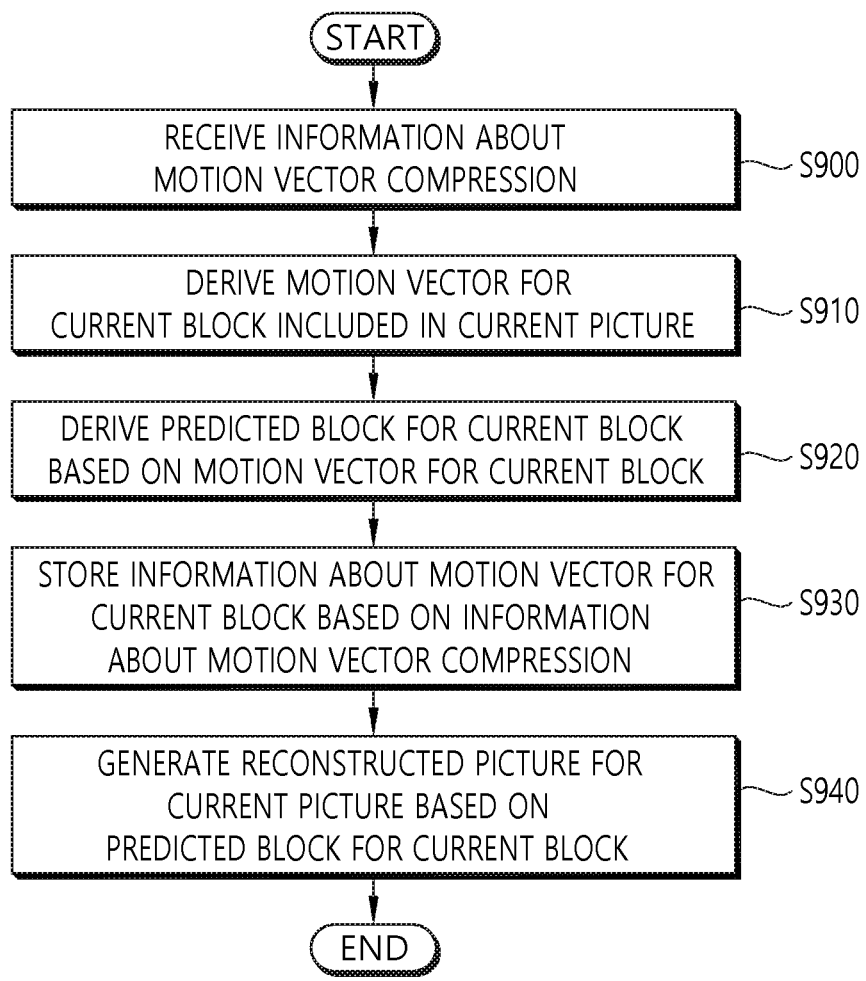
FIG. 9 is a flowchart illustrating an operation of the decoding apparatus according to the exemplary embodiment.
Figure 10:
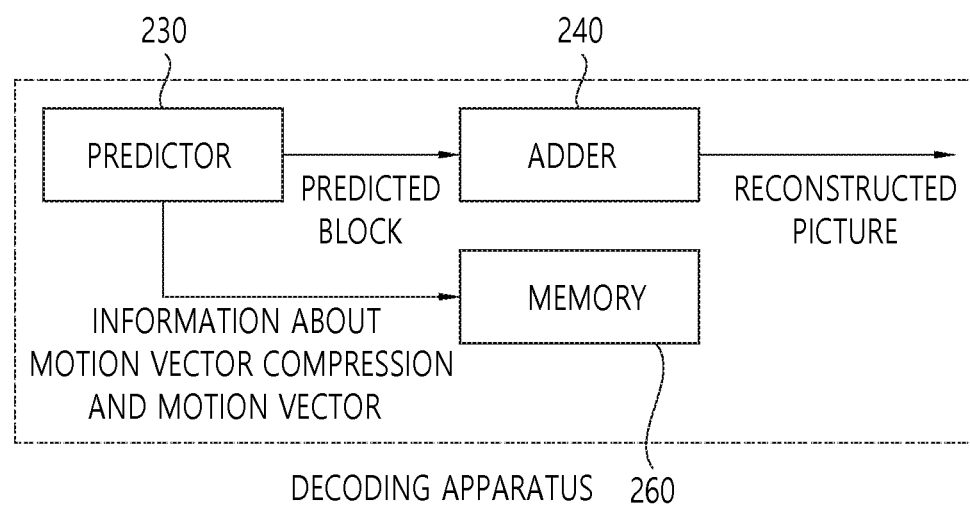
FIG. 10 is a block diagram illustrating a configuration of the decoding apparatus according to the exemplary embodiment.

FIG. 9 is a flowchart illustrating an operation of the decoding apparatus according to the exemplary embodiment, and FIG. 10 is a block diagram illustrating a configuration of the decoding apparatus according to the exemplary embodiment.

Each step illustrated in FIG. 9 may be performed by the decoding apparatus 200 illustrated in FIG. 2. More specifically, S900 to S920 may be performed by the predictor 230 illustrated in FIG. 2, S930 may be performed by the memory 260 illustrated in FIG. 2, and S940 may be performed by the adder 240 illustrated in FIG. 2. Further, operations according to the S900 to the S940 are based on some of the contents described above with reference to FIGS. 3 to 6. Therefore, the description of a specific content overlapping the contents described above with reference to FIGS. 2 to 6 will be omitted or simplified.

As illustrated in FIG. 10, the decoding apparatus according to the exemplary embodiment may include the predictor 230, the adder 240, and the memory 260. However, all the components illustrated in FIG. 10 may not be essential components of the decoding apparatus in some cases, and the decoding apparatus may be implemented by a more or fewer number of components than the components illustrated in FIG. 10.

In the decoding apparatus according to the exemplary embodiment, the predictor 230, the adder 240, and the memory 260 may be implemented by a separate chip, respectively, or at least two components may also be implemented through one chip.

The decoding apparatus according to the exemplary embodiment may receive information about motion vector compression (S900). More specifically, the predictor 230 of the decoding apparatus may receive or decode the information about the motion vector compression.

In the exemplary embodiment, the information about the motion vector compression may include at least one of the information about the number of bits for representing the scale factor for the motion vector, the information about the number of bits for representing the sign for the motion vector, the information about the number of bits for representing the motion data for the motion vector. In an example, the information about the motion vector compression may include all of information about the number of bits for representing the scale factor for the motion vector, information about the number of bits for representing a sign for the motion vector, and information about the number of bits for representing motion data for the motion vector.

In another exemplary embodiment, the information about the motion vector compression may include at least one of information about the number of bits for representing an exponent value for the motion vector and information about the number of bits for representing a mantissa value for the motion vector. In an example, the information about the motion vector compression may include all of the information about the number of bits for representing the exponent value for the motion vector and the information about the number of bits for representing the mantissa value for the motion vector.

In the example, the number of bits for representing the exponent value for the motion vector may be 4. At this time, the number of bits for representing the mantissa value for the motion vector may be 6.

In an exemplary embodiment, the number of bits for representing the scale factor is 2, and a binary code 00 of the information about the scale factor may represent a scale factor 1, a binary code 01 may represent a scale factor 2, a binary code 10 may represent a scale factor 4, and a binary code 11 may represent a scale factor 8.

In another exemplary embodiment, the information about the motion vector compression may include flag information representing whether the motion vector is represented based on a compression method, and if the flag information indicates 1, the information about the motion vector compression may include at least one of the information about the number of bits for representing the scale factor for the motion vector, the information about the number of bits for representing the sign for the motion vector, and the information about the number of bits for representing the motion data for the motion vector.

In the exemplary embodiment, the information about the motion vector compression may be signaled at one or more levels of an SPS level, a picture parameter set (PPS) level, a video parameter set (VPS) level, a slice header level, and a coding unit (CU) level.

In the exemplary embodiment, the information about the motion vector compression may include information about a region of interest (ROI) for deriving a motion vector field (MVF) within the current picture. The information about the ROI may include ROI flag information representing whether the MVF is derived based on the ROI, and if the ROI flag information indicates 1, the information about the ROI may further include coordinate information of the ROI. In an example, the coordinate information of the ROI may include a left offset value of the ROI, a right offset value of the ROI, a top offset value of the ROI, and a bottom offset value of the ROI.

In the exemplary embodiment, the information about the ROI may be signaled at the SPS level. However, the example is not limited to the SPS, and for example, the information about the ROI may be signaled at one or more levels of the SPS level, the PPS level, the VPS level, the slice header level, and the coding unit level.

The decoding apparatus according to the exemplary embodiment may derive a motion vector for the current block included in the current picture (S910). More specifically, the predictor 230 of the decoding apparatus may derive the motion vector for the current block included in the current picture.

The decoding apparatus according to the exemplary embodiment may derive a predicted block for the current block based on the motion vector for the current block (S920). More specifically, the predictor 230 of the decoding apparatus may derive the predicted block for the current block based on the motion vector for the current block.

The decoding apparatus according to the exemplary embodiment may store the information about the motion vector for the current block based on the information about the motion vector compression (S930). More specifically, the memory 260 of the decoding apparatus may store the information about the motion vector for the current block based on the information about the motion vector compression.

In the exemplary embodiment, the information about the motion vector may include information about a motion vector scaled for the motion vector. Further, the information about the motion vector may include the information about the scale factor for the motion vector, the information about the sign for the motion vector, and the information about the motion data for the motion vector. In an example, when the values of the scale factor for the motion vector, the sign about the motion vector, and the motion data for the motion vector are multiplied, the scaled motion vector for the motion vector may be derived.

In another exemplary embodiment, the information about the motion vector may include at least one of the information about the scale factor for the motion vector, the information about the sign for the motion vector, and the information about the motion data for the motion vector. The decoding apparatus may derive the scaled motion data based on the motion vector and the scale factor of the current block, and store the information about the motion vector including the information about the motion data.

The decoding apparatus according to the exemplary embodiment may generate a reconstructed picture for the current picture based on the predicted block for the current block (S940). More specifically, the adder 240 of the decoding apparatus may generate the reconstructed picture for the current picture based on the predicted block for the current block.

In the exemplary embodiment, the decoding apparatus may store only information from a single list. For example, if two lists refer to the same picture in bi-prediction, the decoding apparatus may store only information from one list of the two lists. The present exemplary embodiment may be performed based on a conditional parsing in the SPS, the PPS, or other headers. The conditional parsing may mean indicating whether the single list may be used for updating the MVF based on the syntax element, for example.

In the exemplary embodiment, the determination for storing the MVF may be adaptively performed, and the determination may be performed based on a CTU, a slice, or a tile group. The adaptively performing of the determination for storing the MVF may be referred to as "adaptive MVF storage", and an example of the signaling for the adaptive MVF storage is expressed in Table 6 below.

TABLE 6

| | Description |
|---|---|
| seq_parameter_set_rbsp( ) { | |
| ... | |
| store_mvf_data | u(1) |
| if(store_mvf_data){ | |
| mvf_storage_idx | ue(v) |
| } | |
| ... | |
| } | |

In Table 6, if a value of the store_mvf_data is 0, the adaptive MVF storage may not be used. If the value of the store_mvf_data is 1, the adaptive MVF storage may be used. If the value of the store_mvf_data is 1, the mvf_storage_idx may be signaled.

If the value of the mvf_storage_idx is 0, the adaptive MVF storage may be considered at the frame level; if the value of the mvf_storage_idx is 1, the adaptive MVF storage may be considered at the CTU level; and if the value of the mvf_storage_idx is 1, the adaptive MVF storage may be considered at the slice level or the tile group level. Based on Table 6, whether the adaptive MVF storage may be performed may be considered at all frame levels, all CTU levels, all slice levels, or all tile group levels.

According to the decoding apparatus and the operation method of the decoding apparatus illustrated in FIGS. 9 and 10, the decoding apparatus may receive the information about the motion vector compression (S900), derive the motion vector for the current block included in the current picture (S910), derive the predicted block for the current block based on the motion vector for the current block (S920), store the information about the motion vector for the current block based on the information about the motion vector compression (S930), and generate the reconstructed picture for the current picture based on the predicted block for the current block (S940). That is, it is possible to store the information about the motion vector based on the motion vector compression in the inter prediction process based on the motion vector, thereby enhancing image coding efficiency.

The aforementioned method according to the present disclosure may be implemented by a software form, and the encoding apparatus and/or the decoding apparatus according to the present disclosure may be included in an apparatus for performing an image processing, such as a TV, a computer, a smartphone, a set top box, or a display apparatus, for example.

The aforementioned respective part, module, or unit may be a processor or a hardware part for executing consecutive performing processes stored in a memory (or storage unit). The respective steps described in the aforementioned exemplary embodiment may be performed by a processor or hardware parts. The respective modules/blocks/units described in the aforementioned exemplary embodiment may be operated as the hardware/processor. Further, the methods suggested by the present disclosure may be executed by a code. This code may be written on a storage medium readable by the processor, and thus read by the processor provided by the apparatus.

In the aforementioned exemplary embodiments, while the methods are described based on the flowcharts shown as a series of steps or blocks, the present disclosure is not limited to the order of steps, and a certain step may occur in different order from or simultaneously with a step different from that described above. Further, those skilled in the art will understand that the steps illustrated in the flowchart are not exclusive, and other steps may be included or one or more steps in the flowcharts may be deleted without affecting the scope of the present disclosure.

When the exemplary embodiments of the present disclosure are implemented in software, the aforementioned method may be implemented by modules (processes, functions, and so on) for performing the aforementioned functions. Such modules may be stored in a memory and executed by a processor. The memory may be internal or external to the processor, and the memory may be coupled to the processor using various well known means. The processor may include an application-specific integrated circuit (ASIC), other chipsets, a logic circuit, and/or a data processing device. The memory may include a read-only memory (ROM), a random access memory (RAM), a flash memory, a memory card, a storage medium, and/or other storage device.

What is claimed is:

1. A picture decoding method performed by a decoding apparatus, the method comprising:
deriving information related to motion vector compression;
deriving a motion vector for a current block in a current picture;
deriving a predicted block for the current block based on the motion vector for the current block;
deriving a scaled motion vector based on the information related to the motion vector compression;
storing information about the motion vector for the current block, wherein the information about the motion vector comprises information about the scaled motion vector for the motion vector; and
generating a reconstructed picture for the current picture based on the predicted block for the current block,
wherein the information related to the motion vector compression includes information related to a number of bits for representing the scaled motion vector, information about a scale factor for the motion vector, and information about a sign and motion data for the motion vector,
wherein the number of bits for representing the scaled motion vector is less than 16, and
wherein the information about the sign and the motion data is represented by 6 bits.

2. The picture decoding method of claim 1, wherein the information related to the motion vector compression comprises: at least one of information about a number of bits for representing an exponent value for the motion vector or information about a number of bits for representing a mantissa value for the motion vector.

3. The picture decoding method of claim 1, wherein when values of the scale factor for the motion vector, the sign for the motion vector, and the motion data for the motion vector are multiplied, the scaled motion vector for the motion vector is derived.

4. The picture decoding method of claim 1, wherein the storing of the information about the motion vector for the current block comprises:
deriving the motion data based on the motion vector and the scale factor of the current block; and
storing the information about the sign and the motion data for the motion vector.

5. The picture decoding method of claim 2, wherein the number of bits for representing the exponent value for the motion vector is 4.

6. The picture decoding method of claim 1, wherein the information about the scale factor is represented by 2 bits, and
wherein a binary code 00 of the information about the scale factor represents a scale factor 1, a binary code 01 represents a scale factor 2, a binary code 10 represents a scale factor 4, and a binary code 11 represents a scale factor 8.

7. The picture decoding method of claim 1, wherein the information related to the motion vector compression comprises: flag information representing whether the motion vector is represented based on a compression method, and
wherein based on a value of the flag information being equal to 1, the information related to the motion vector compression comprises: the information about the scale factor for the motion vector, and the information about the sign and the motion data for the motion vector.

8. The picture decoding method of claim 1, wherein the information related to the motion vector compression is signaled at one or more levels of an SPS level, a picture parameter set (PPS) level, a video parameter set (VPS) level, a slice header level, and a coding unit (CU) level.

9. The picture decoding method of claim 1, wherein the information related to the motion vector compression comprises: information about a region of interest (ROI) for deriving a motion vector field (MVF) within the current picture, wherein the information about the ROI comprises: ROI flag information representing whether the MVF is derived based on the ROI, and wherein based on a value of the ROI flag information being equal to 1, the information about the ROI further comprises: coordinate information of the ROI.

10. The picture decoding method of claim 9, wherein the coordinate information of the ROI comprises: a left offset value of the ROI, a right offset value of the ROI, a top offset value of the ROI, and a bottom offset value of the ROI.

11. A picture encoding method performed by an encoding apparatus comprising:

deriving a motion vector for a current block;

generating information related to motion vector compression;

deriving a predicted block for the current block based on the motion vector for the current block;

deriving a scaled motion vector based on the information related to the motion vector compression;

storing information about the motion vector for the current block, wherein the information about the motion vector comprises information about the scaled motion vector for the motion vector;

deriving residual samples for the current block based on the predicted block for the current block; and encoding image information comprising information about the residual samples and the information related to the motion vector compression, wherein the information related to the motion vector compression includes information related to a number of bits for representing the scaled motion vector, information about a scale factor for the motion vector, and information about a sign and motion data for the motion vector, wherein the number of bits for representing the scaled motion vector is less than 16, and wherein the information about the sign and the motion data is represented by 6 bits.

12. The picture decoding method of claim 1, wherein the current block is one of 4×4 subblocks comprised in a block using one of a 4-parameter motion model or a 6-parameter motion model, and wherein a motion vector of a center right bottom position is used as the motion vector for the current block.

13. The picture encoding method of claim 11, wherein the information related to the motion vector compression comprises: at least one of information about a number of bits for representing an exponent value for the motion vector or information about a number of bits for representing a mantissa value for the motion vector.

14. The picture encoding method of claim 11, wherein the current block is one of 4×4 subblocks comprised in a block using one of a 4-parameter motion model or a 6-parameter motion model, and wherein a motion vector of a center right bottom position is used as the motion vector for the current block.

15. A non-transitory computer-readable digital storage medium storing a bitstream generated by a method, the method comprising:

deriving a motion vector for a current block;

generating information related to motion vector compression;

deriving a predicted block for the current block based on the motion vector for the current block;

deriving a scaled motion vector based on the information related to the motion vector compression;

storing information about the motion vector for the current block, wherein the information about the motion vector comprises information about the scaled motion vector for the motion vector;

deriving residual samples for the current block based on the predicted block for the current block; and generating the bitstream by encoding image information comprising information about the residual samples and the information related to the motion vector compression, wherein the information related to the motion vector compression includes information related to a number of bits for representing the scaled motion vector, information about a scale factor for the motion vector, and information about a sign and motion data for the motion vector, wherein the number of bits for representing the scaled motion vector is less than 16, and wherein the information about the sign and the motion data is represented by 6 bits.

16. The non-transitory computer-readable digital storage medium of claim 15, wherein the information related to the motion vector compression comprises: at least one of information about a number of bits for representing an exponent value for the motion vector or information about a number of bits for representing a mantissa value for the motion vector.

17. The non-transitory computer-readable digital storage medium of claim 15, wherein the current block is one of 4×4 subblocks comprised in a block using one of a 4-parameter motion model or a 6-parameter motion model, and wherein a motion vector of a center right bottom position is used as the motion vector for the current block.

\* \* \* \* \*